United States Patent [19]

Adler

[11] 4,391,224
[45] Jul. 5, 1983

[54] ANIMAL AMUSEMENT APPARATUS

[76] Inventor: Harold A. Adler, 1457 Eastwind Cir., Westlake Village, Calif. 91361

[21] Appl. No.: 287,191

[22] Filed: Jul. 27, 1981

[51] Int. Cl.³ ............................................. A01K 29/00
[52] U.S. Cl. ........................................ 119/29; 46/254
[58] Field of Search ................ 119/29, 51 R; 46/254

[56] References Cited

U.S. PATENT DOCUMENTS

| | | | |
|---|---|---|---|
| 4,036,178 | 7/1977 | Lee et al. | 119/29 |
| 4,194,737 | 3/1980 | Farmer | 46/254 |
| 4,213,270 | 7/1980 | Oda | 46/254 |
| 4,270,307 | 6/1981 | Arigaya | 46/254 |

Primary Examiner—Jay N. Eskovitz
Attorney, Agent, or Firm—Allan M. Shapiro

[57] ABSTRACT

An animal amusement device wherein a radio transmitter of limited range is carried by the animal. A ball, or other type of movable structure is to be located upon the ground or other supportive surface in close proximity to the animal. Upon the animal moving to within a short distance of the ball, the ball will become randomly movable by being activated by the radio signal mounted within the collar of the animal.

3 Claims, 3 Drawing Figures

ANIMAL AMUSEMENT APPARATUS

BACKGROUND OF THE INVENTION

The field of this invention relates to an amusement device which is designed primarily to be employed in conjunction with animals, such as dogs and cats.

In practically every pet store, drug store and grocery store there may be purchased a wide variety of toys for either a cat or dog. Different types of balls, bones, toys which squeek, etc. can be purchased. In every case, each of the toys is passive. The only way that any of the toys can become movable is through the toy being thrown by a human being or upon the toy being moved by the animal itself.

It is well known that animals, such as dogs and cats, love to chase anything that moves. It a toy could be constructed which becomes movable when the animal comes to within a few feet of the device, there is no doubt that such a toy would be quite entertaining to a dog or cat.

SUMMARY OF THE INVENTION

The toy of this invention takes the form of a ball, cylinder, wheel device, or other type of motile device, each of which is to be readily movable along a supportive surface, such as the ground. Within the ball, cylinder or wheel device, there is located a motor which operates a drive wheel assembly. The drive wheel assembly is to be in continuous contact with the inner surface of the ball, cylinder or wheel device.

Operation of the motor operates the drive wheel assembly which moves the motor and drive assembly within the device, which in turn cause the device to randomly move across the supportive surface. Also located within the device is a radio receiver which will, when activated by a certain radio signal, cause the motor to become operative. A certain radio signal is transmitted from a radio transmitter which is carried by the animal itself, such as on the collar located about the neck of the animal. The radio receiver only causes activation of the motor when the transmitted signal is of a certain described strength, such as when the animal is within a hundred and fifty to two hundred centimeters of the device.

The primary objective of this invention is to construct an animal toy which when the animal comes within a few feet of the toy, the toy randomly moves, thereby freeing the owner from the sometimes onerous and time consuming duty of entertaining a bored, unhappy pet, and at the same time providing the pet owner with the pleasurable entertainment of watching his active pet. It is the unique utilization of this "chase" instinct in all animals by this device that makes it especially attractive, and useful, as a pet toy.

DETAILED DESCRIPTION OF THE SHOWN EMBODIMENT

Figure 1:
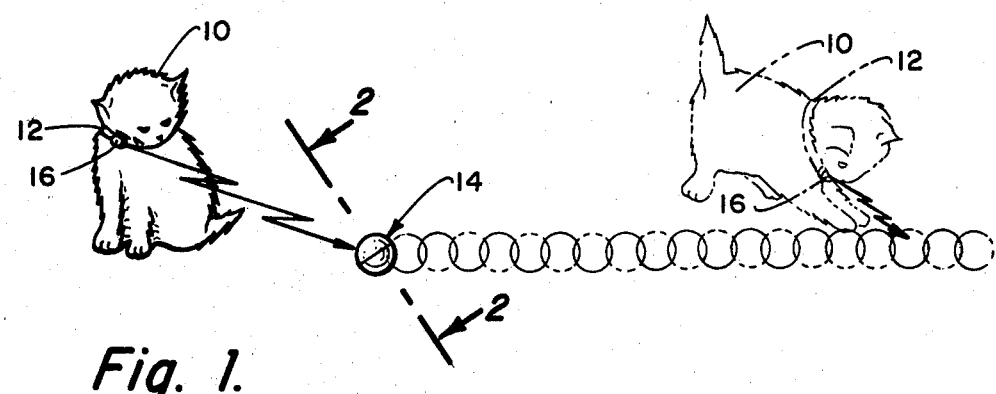
FIG. 1 is a diagramatic view showing the toy of this invention as it would be utilized in connection with a domestic animal, such as a cat.
Figure 2:
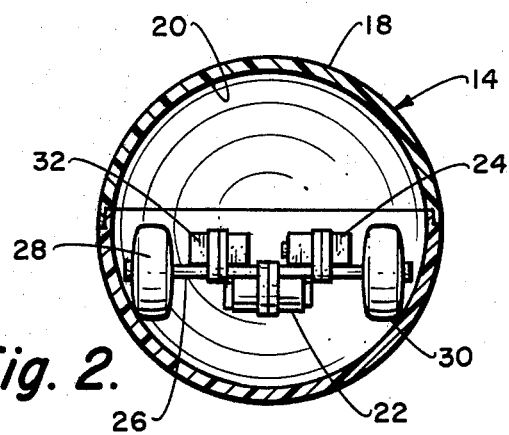
FIG. 2 is a cross-sectional view through a portion of the apparatus of this invention taken along line 2—2 of FIG. 1.
Figure 3:
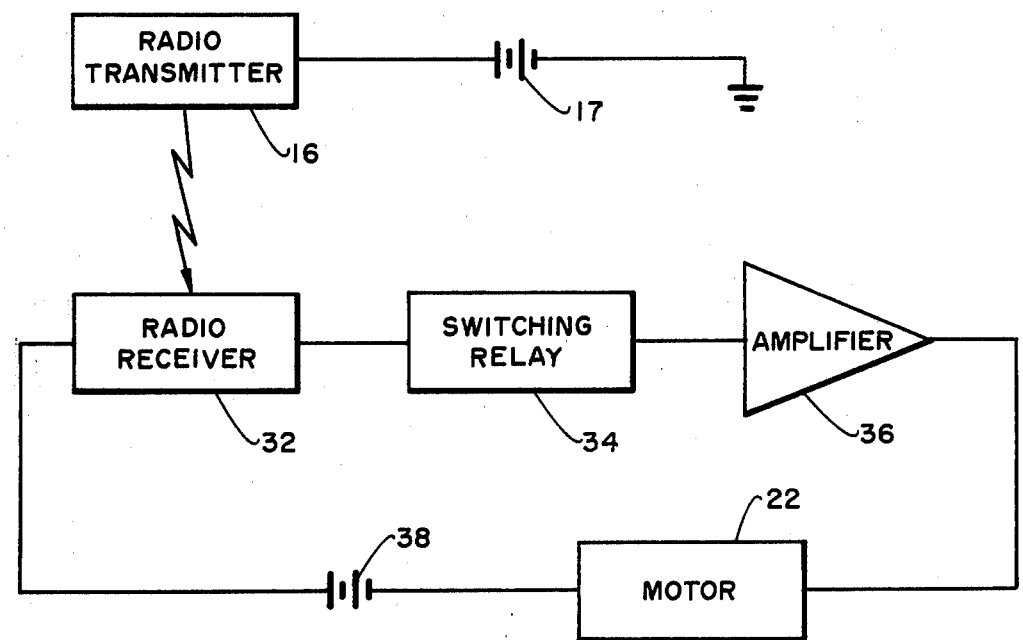
FIG. 3 is an electrical block diagram of the apparatus of this invention.

Referring particularly to the drawing, there is depicted in FIG. 1 an animal 10, which has a collar 12 located about the neck of the animal. A device in the form of a ball 14 is shown located upon a supportive surface in close proximity to the animal 10. It is to be understood that the basic operation of the apparatus of this invention is that when the animal 10 comes within a certain range of the device 14, that the device 14 will become activated and begin to randomly move upon the supportive surface. This will then function to attract the animal 10, which will cause the animal 10 to chase, bite or otherwise be entertained by the ball 14.

Attached to the collar 12 is a radio transmitter 16. The use of radio transmitters is deemed to be conventional and does not, in and of itself, contain any novel features. A typical example of a radio transmitter would comprise a mechanical arrangement that generates an ultrasonic tone burst by mechanically striking a bar of metal. There is to be included a power source 17 being attached to the collar 12. The power source is to function to cause the ultrasonic tone to be constantly emitted from the transmitter 16. The transmitter 16 is specifically fabricated to have a limited transmitting range. The preferable limited effective transmitting range should be within one hundred and fifty to two hundred centimeters. This means that once the animal 10 gets within one hundred and fifty to two hundred centimeters of the ball 14 that the ball 14 will then begin to move randomly.

The ball 14 takes the form of a two-part housing 18 within which is located an internal chamber 20. Within the internal chamber 20, there is located a motor 22 which is to be operated by electrical energy from a battery 24 to rotate a shaft 26. Attached to the shaft 26 are a pair of driving wheels 28 and 30. The driving wheels 28 and 30 will normally be constructed of a frictionally grabbing material, such as rubber or the like. The wheels 28 and 30 are to be in continuous contact with the wall of the chamber 20.

Located adjacent the motor 22 is a radio receiver 32. Electrically connected between the motor 22 and the radio receiver 32 is a switch in the form of a switching relay 34 and an amplifier 36. Upon the radio receiver receiving the radio signal from the radio transmitter 16, the switch 34 is closed which will cause the electrical power from the power source 38 to be conducted through the switch 34 and be amplified by the amplifier 36 and then be conducted to the motor to operate the motor 22. It is to be understood that the motor 22 will continue to operate as long as the radio receiver 32 continues to receive the signal from the transmitter 16.

It is to be understood that operation of the motor 22 will cause the driving wheels to move upon the wall of the chamber 20. This will cause the ball 14 to roll upon the supportive surface. It is preferred that such movement be random so that the ball 14 will be inclined to move in any direction.

The structure of the radio receiver 32 is also, in and of itself, deemed to be conventional. Typical construction of the receiver would be an ultrasonic transducer that produces an electrical signal when an ultrasonic tone is received.

Although the structure of the present invention has been described in conjunction with domesticated pets, it is considered to be within the scope of this invention to employ the subject matter in toys for children. For example, a hunting game could be manufactured wherein the firearm included the transmitter and the target (now movable) included the receiver. The firearm could firm harmless projectiles, such as a rubber suction tipped dart.

It is obvious that this is a preferred embodiment of the invention, and that the principle of elicited movement of the entertainment object of the pet may be varied considerably from a rolling movement to a jumping or oscillating one. Also, any variety of movement or construction of entertainment objects is conceivable by incorporating the unique feature of motion-attraction initiated by remote means by the pet itself, when the transmitter is activated upon the animal. In this way, use of the "chase" instinct of all animals is utilized by incorporation into an attractive, apparently self-motile object and substantial variations in distance activation would be within the scope of this invention.

It is considered to be within the scope of this invention that the radio transmitter could comprise an ultrasonic emitter, a light source, a heat source or an electromagnetic source.

What is claimed is:

1. Animal attraction apparatus comprising:
   motor means for operating only when actuated;
   transmitter means for transmitting a signal;
   receiver means having an output coupled in actuation relationship to said motor means, said receiver means being for receiving said signal and, when said signal as received is of predetermined power, for causing actuation of said motor means;
   attachment means for carrying said transmitter means and for mounting on a domesticated animal of the predator type; and
   simulated prey means which is normally unmoving and which, when in motion, tends to attract such animal, said prey means being for carrying said motor means and coupled to said motor means so that said motor means, when actuated, operates to cause said prey means to move;
   said transmitter means and receiver means having a signal transmitting and receiving power relationship such that, when said transmitter means is carried by such animal to within a predetermined distance of said prey means, said receiver means actuates said motor means to cause said prey means to move.

2. The animal attraction apparatus as defined in claim 1 wherein:
   said attachment means comprises a collar which is adapted to be worn around the neck of the animal.

3. The animal attraction apparatus as defined in claim 1 or 2 wherein:
   said domesticated animal is feline; and
   said predetermined distance is about two meters.

* * * * *